United States Patent
Marra et al.

(10) Patent No.: US 11,481,960 B2
(45) Date of Patent: Oct. 25, 2022

(54) SYSTEMS AND METHODS FOR GENERATING STABILIZED IMAGES OF A REAL ENVIRONMENT IN ARTIFICIAL REALITY

(71) Applicant: Meta Platforms Technologies, LLC, Menlo Park, CA (US)

(72) Inventors: Alessia Marra, Zurich (CH); Gioacchino Noris, Zurich (CH); Panya Inversin, Gersau (CH)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/138,414

(22) Filed: Dec. 30, 2020

(65) Prior Publication Data
US 2022/0207816 A1   Jun. 30, 2022

(51) Int. Cl.
*G06F 3/01* (2006.01)
*G06T 7/70* (2017.01)
(Continued)

(52) U.S. Cl.
CPC .............. *G06T 15/20* (2013.01); *G06F 3/012* (2013.01); *G06F 3/013* (2013.01); *G06F 3/0346* (2013.01); *G06T 7/70* (2017.01); *H04N 13/344* (2018.05); *G02B 27/017* (2013.01); *G06F 3/011* (2013.01); *G06F 3/04815* (2013.01); *G06F 2200/00* (2013.01); *G06T 19/006* (2013.01); *G06T 2207/30244* (2013.01); *G06V 10/25* (2022.01);
(Continued)

(58) Field of Classification Search
CPC ....... G06T 15/20; G06T 17/70; G06T 19/006; G06T 2207/30244; G06F 3/012; G06F 3/013; G06F 3/0346; G06F 3/04815; G06F 2200/00; H04N 5/272; H04N 13/344; G02B 27/017; G06V 10/25; G09G 2340/10; G09G 2340/12

See application file for complete search history.

(56) References Cited

U.S. PATENT DOCUMENTS 10,001,645 B2 *   6/2018   Norden ................. G06F 3/1454
10,803,663 B2 *  10/2020   Wang ...................... G06F 3/011
(Continued)

OTHER PUBLICATIONS

International Search Report and Written Opinion for International Application No. PCT/US2021/065655, dated Mar. 29, 2022, 13 pages.

*Primary Examiner* — Mihir K Rayan
(74) *Attorney, Agent, or Firm* — Baker Botts L.L.P.

(57) ABSTRACT

A method includes a computing system tracking motions performed by a hand of a user, determining one or more anchor locations in a three-dimensional space, and generating a virtual surface anchored in the three-dimensional space. An image of a real environment is captured using a camera worn by the user, and a pose of the camera when the image is captured is determined. The computing system determines a first viewpoint of a first eye of the user and a region in the image that, as viewed from the camera, corresponds to the virtual surface. The computing system renders an output image based on (1) the first viewpoint relative to the virtual surface and (2) the image region corresponding to the virtual surface, and displays the output image on a first display of the device, the first display being configured to be viewed by the first eye of the user.

20 Claims, 14 Drawing Sheets

(51) Int. Cl.
*H04N 13/344* (2018.01)
*G06F 3/0346* (2013.01)
*G06V 10/25* (2022.01)
*H04N 5/272* (2006.01)
*G06T 19/00* (2011.01)
*G02B 27/01* (2006.01)
*G06T 15/20* (2011.01)
*G06F 3/04815* (2022.01)

(52) U.S. Cl.
CPC ..... *G09G 2340/10* (2013.01); *G09G 2340/12* (2013.01); *H04N 5/272* (2013.01)

(56) References Cited

U.S. PATENT DOCUMENTS

| | | | |
|---|---|---|---|
| 11,037,359 B1* | 6/2021 | Bleyer | H04N 13/128 |
| 11,200,745 B2* | 12/2021 | Johnson | G06T 15/005 |
| 2008/0084472 A1* | 4/2008 | Trudeau | G02B 27/017 348/51 |
| 2008/0088529 A1* | 4/2008 | Tang | H04N 13/344 348/E13.041 |
| 2009/0259967 A1* | 10/2009 | Davidson | G06F 3/0485 715/800 |
| 2012/0264510 A1* | 10/2012 | Wigdor | A63F 13/40 463/31 |
| 2017/0287215 A1* | 10/2017 | Lalonde | H04N 5/225 |
| 2018/0173404 A1* | 6/2018 | Smith | G06F 3/017 |
| 2018/0288354 A1* | 10/2018 | Anderson | G06T 11/60 |
| 2019/0101758 A1 | 4/2019 | Zhu et al. | |
| 2019/0385372 A1* | 12/2019 | Cartwright | G06T 19/003 |
| 2020/0026922 A1* | 1/2020 | Pekelny | G06T 19/006 |
| 2020/0143584 A1* | 5/2020 | Noris | G06T 7/248 |

* cited by examiner

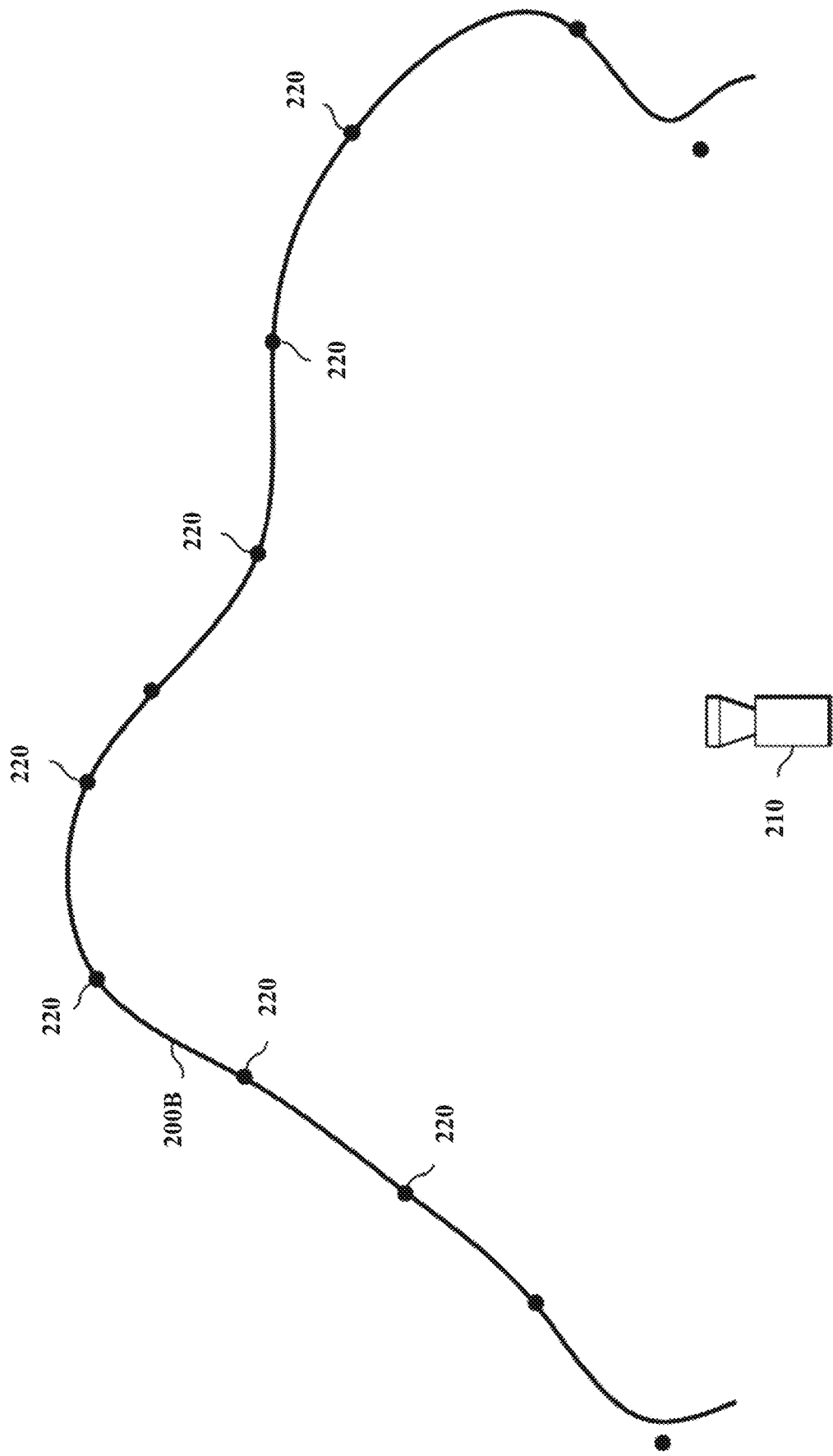

SYSTEMS AND METHODS FOR GENERATING STABILIZED IMAGES OF A REAL ENVIRONMENT IN ARTIFICIAL REALITY

TECHNICAL FIELD

This disclosure generally relates to computer graphics and 3D reconstruction techniques.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD 104) connected to a host computer system, a standalone HMD 104, a mobile device or computing system, or any other hardware platform capable of providing artificial reality content to one or more viewers.

SUMMARY OF PARTICULAR EMBODIMENTS

"Passthrough" is a feature that allows a user to see his physical environment while wearing an artificial reality device. Information about the user's physical environment is visually "passed through" to the user by having the device display information captured by the headset's external-facing cameras. The present invention improves the stability and resource requirements associated with rendering and displaying passthrough images by defining a particular region or virtual surface of the virtual environment, for example a plane or planar surface, for displaying passthrough images (a "passthrough area"). When the virtual surface corresponds to, for example, a particular physical surface in the real environment that the user frequently interacts with (e.g., the user's desk, a tabletop, the user's hands, or a canvas on a wall), there is no need to continuously calculate the depth of the passthrough area as the user moves throughout a three-dimensional environment, because the particular physical surface in the real environment remains at a fixed pose.

In particular embodiments the computing system requests the user to perform a one-time setup to specify anchor locations and determine a pose of the virtual surface in the real environment, through for example, one or more controller or hand movements. Once defined, the computing system may receive images and identify one or more regions of the image that correspond to the virtual surface. The computing system may display the passthrough images on a device display associated with a user based on one or more criteria, for example the distance between the user and the virtual surface. Additionally, the computing system may also display passthrough images for the surrounding walls, floor, etc. that are nearby or adjacent to the virtual surface. In particular embodiments, the computing system may apply one or more visual effects to enhance the display of the one or more passthrough images to the user.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 2A and 2B illustrate top-down visualizations of a 3D mesh being deformed to represent the contours of an observed environment.

DESCRIPTION OF EXAMPLE EMBODIMENTS

Figure 1A:
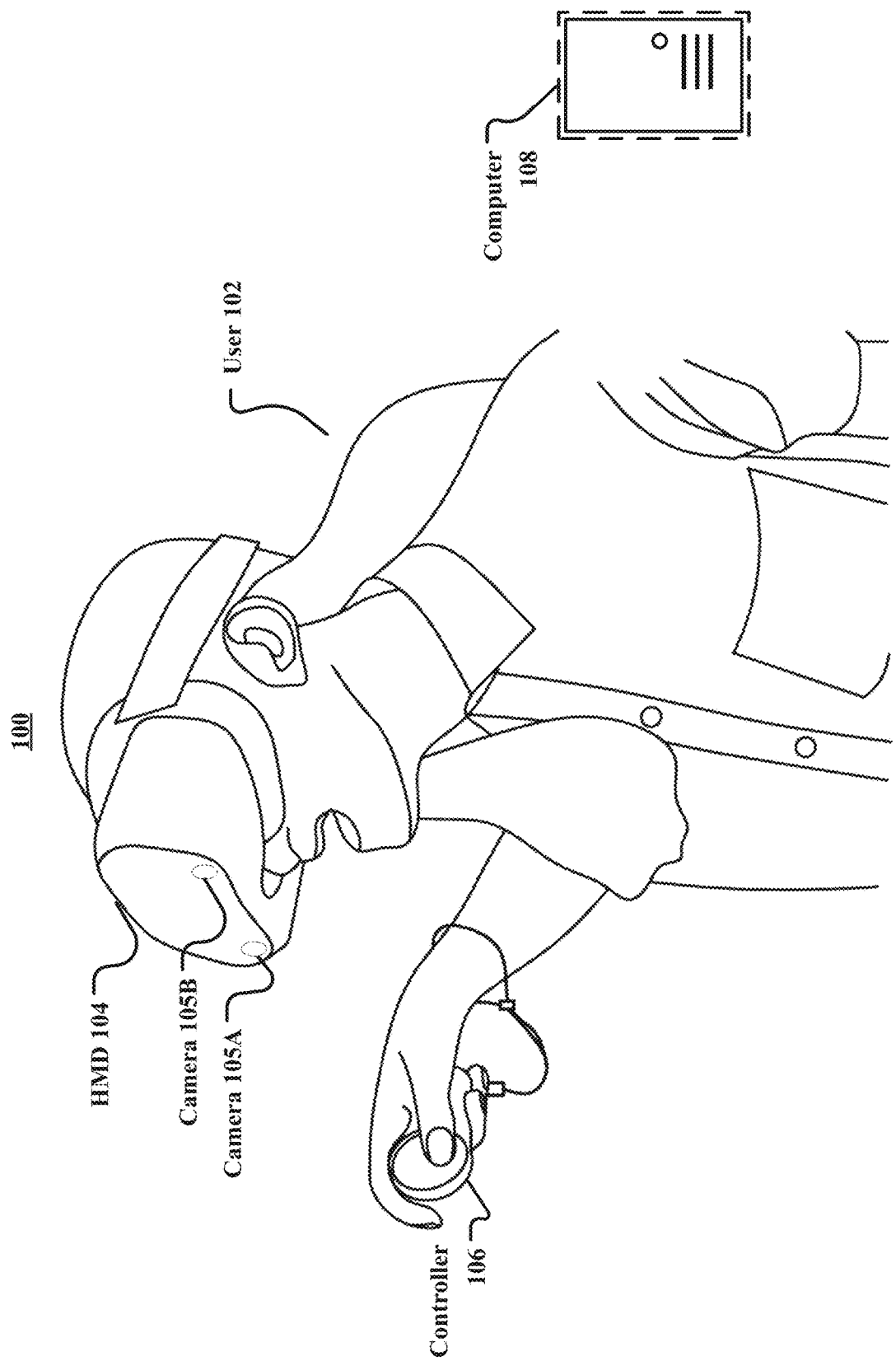
FIG. 1A illustrates an example artificial reality system worn by a user, in accordance with particular embodiments.

FIG. 1A illustrates an example of an artificial reality system 100 worn by a user 102. In particular embodiments, the artificial reality system 100 may comprise a head-mounted device ("HMD 104") 104, a controller 106, and a computing system 108. The HMD 104 may be worn over the user's eyes and provide visual content to the user 102 through internal displays (not shown). The HMD 104 may have two separate internal displays, one for each eye of the user 102. As illustrated in FIG. 1A, the HMD 104 may completely cover the user's field of view. By being the exclusive provider of visual information to the user 102, the HMD 104 achieves the goal of providing an immersive artificial-reality experience. One consequence of this, however, is that the user 102 would not be able to see the physical (or real) environment surrounding him, as his vision is shielded by the HMD 104. As such, the passthrough feature described herein is needed to provide the user with real-time visual information about his physical environments.

Referring again to FIG. 1A, the HMD 104 may have external-facing cameras, such as the two forward-facing cameras 105A and 105B shown in FIG. 1A. While only two forward-facing cameras 105A-B are shown, the HMD 104 may have any number of cameras facing any direction (e.g., an upward-facing camera to capture the ceiling or room lighting, a downward-facing camera to capture a portion of the user's face and/or body, a backward-facing camera to capture a portion of what's behind the user, and/or an internal camera for capturing the user's eye gaze for eye-tracking purposes). The external-facing cameras 105A and 105B are configured to capture the physical environment around the user and may do so continuously to generate a sequence of frames (e.g., as a video).

In particular embodiments, the pose (e.g., position and orientation) of the HMD 104 within the environment may be needed. For example, in order to render an appropriate display for the user 102 while he is moving about in a virtual environment, the system 100 would need to determine his position and orientation at any moment. Based on the pose of the HMD 104, the system 100 may further determine the viewpoint of either of the cameras 105A and 105B or either of the user's eyes. In particular embodiments, the HMD 104 may be equipped with inertial-measurement units ("IMU"). The data generated by the IMU, along with the stereo imagery captured by the external-facing cameras 105A-B, allow the system 100 to compute the pose of the HMD 104 using, for example, SLAM (simultaneous localization and mapping) or other suitable techniques.

In particular embodiments, the artificial reality system 100 may further have one or more controllers 106 that enable the user 102 to provide inputs. The controller 106 may communicate with the HMD 104 or a separate computing unit 108 via a wireless or wired connection. The controller 106 may have any number of buttons or other mechanical input mechanisms. In addition, the controller 106 may have an IMU so that the position of the controller 106 may be tracked. The controller 106 may further be tracked based on predetermined patterns on the controller. For example, the controller 106 may have several infrared LEDs or other known observable features that collectively form a predetermined pattern. Using a sensor or camera, the system 100 may be able to capture an image of the predetermined pattern on the controller. Based on the observed orientation of those patterns, the system may compute the controller's position and orientation relative to the sensor or camera.

The artificial reality system 100 may further include a computer unit 108. The computer unit may be a stand-alone unit that is physically separate from the HMD 104 or it may be integrated with the HMD 104. In embodiments where the computer 108 is a separate unit, it may be communicatively coupled to the HMD 104 via a wireless or wired link. The computer 108 may be a high-performance device, such as a desktop or laptop, or a resource-limited device, such as a mobile phone. A high-performance device may have a dedicated GPU and a high-capacity or constant power source. A resource-limited device, on the other hand, may not have a GPU and may have limited battery capacity. As such, the algorithms that could be practically used by an artificial reality system 100 depends on the capabilities of its computer unit 108.

Figure 1B:
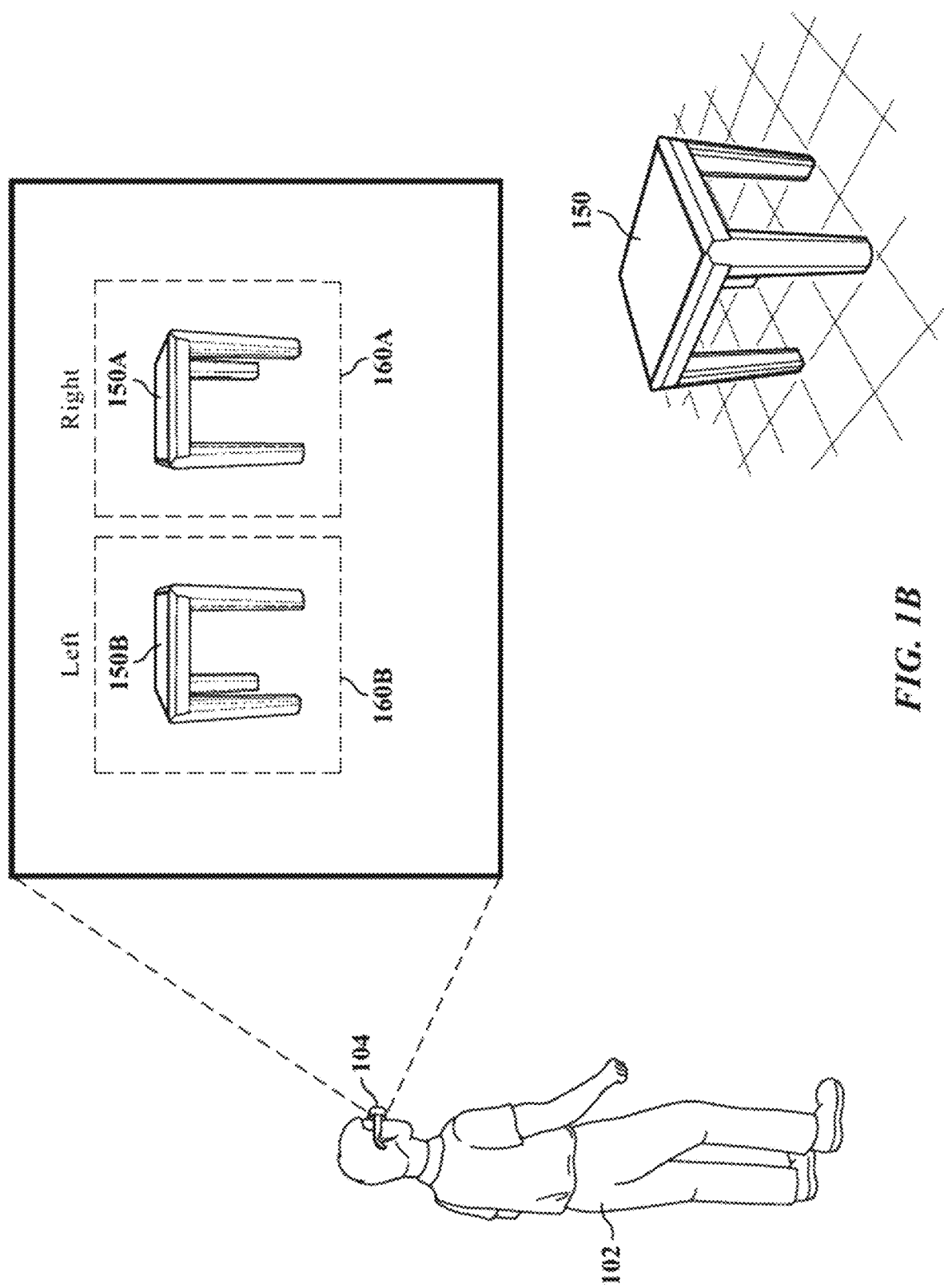
FIG. 1B illustrates an example of a passthrough feature, in accordance with particular embodiments.

"Passthrough" is a feature that allows a user to see his physical environment while wearing HMD 104. Information about the user's physical environment is visually "passed through" to the user by having the HMD 104 display information captured by the headset's external-facing cameras 105A and 105B. FIG. 1B illustrates an example of the passthrough feature. A user 102 may be wearing an HMD 104, immersed within a three-dimensional space, for example and not by way of limitation, a virtual reality environment. A physical table 150 is in the physical environment surrounding the user 102. However, due to the HMD 104 blocking the vision of the user 102, the user 102 is unable to directly see the table 150. To help the user perceive his physical environment while wearing the HMD 104, the passthrough feature captures information about the physical environment using, for example, the aforementioned external-facing cameras 105A-B. Methods for rendering and displaying passthrough images are described further in U.S. application Ser. No. 16/746,128, filed Jul. 24, 2020, entitled "Systems, Methods, and Media for Generating Visualization of Physical Environment in Artificial Reality," hereby incorporated by reference in its entirety.

Simply displaying the captured images would not work as intended, however. Since the locations of the cameras 105A-B do not coincide with the locations of the user's eyes, simply displaying the captured images would not provide the user 102 with an accurate view of the physical environment since the cameras 105A-B cannot physically be located at the exact same viewpoint as the user's eyes. As such, the passthrough feature described herein uses a re-projection technique that generates a 3D representation of the physical environment and then renders images based on the 3D representation from the viewpoints of the user's eyes. The captured information may then be re-projected to the user 102 based on his viewpoints. In particular embodiments where the HMD 104 has a right display 160A for the user's right eye and a left display 160B for the user's left eye, the system 100 may individually render (1) a re-projected view 150A of the physical environment for the right display 160A based on a viewpoint of the user's right eye and (2) a re-projected view 150B of the physical environment for the left display 160B based on a viewpoint of the user's left eye.

In particular embodiments, the 3D representation may be generated based on depth measurements of physical objects observed by the cameras 105A-B. Depth may be measured in a variety of ways. In particular embodiments, depth may be computed based on stereo images. For example, the two forward-facing cameras 105A-B may share an overlapping field of view and be configured to capture images simultaneously. As a result, the same physical object may be captured by both cameras 105A-B at the same time. For example, a particular feature of an object may appear at one pixel pA in the image captured by camera 105A, and the same feature may appear at another pixel pB in the image captured by camera 105B. As long as the depth measurement system knows that the two pixels correspond to the same feature, it could use triangulation techniques to compute the depth of the observed feature. For example, based on the camera 105A's position within a 3D space and the pixel location of pixel pA relative to the camera 105A's field of view, a line could be projected from the camera 105A and through the pixel pA. A similar line could be projected from the other camera 105B and through the pixel pB. Since both pixels are supposed to correspond to the same physical feature, the two lines should intersect. The two intersecting lines and an imaginary line drawn between the two cameras 105A and 105B form a triangle, which could be used to compute the distance of the observed feature from either camera 105A or 105B or a point in space where the observed feature is located.

In addition, since the images have no depth, simply displaying the images would not provide the user with proper parallax effects if he were to shift away from where the images were taken. Incorrect parallax, coupled with user motion, could lead to motion sickness. Thus, to generate correct parallax, particular embodiments of the passthrough feature extracts information about the environment from the captured images (e.g., depth information), use the information to generate a 3D model (a geometric scene representation) of the physical environment, and reconstruct a scene of the modeled environment from the user's current viewpoint.

Photon-to-visuals latency is another issue addressed by the passthrough feature. The delay between a photon hitting the camera and it appearing on the screen (as part of the captured image) determines the visual comfort of interacting in a dynamic world. Particular embodiments of the passthrough feature overcomes this issue by updating the 3D model representation of the environment based on images captured at a sufficiently high rate (e.g., at 30 Hz, 60 Hz, etc.) and rendering images based on the latest known head pose of the user.

The passthrough image can be unstable (e.g., it warps visibly) and resource-intensive to render and display because the 3D representation must be continuously updated as the user moves throughout the physical environment. Further, the depth estimations of objects are often inaccurate. Over time, this leads to inaccuracies and inconsistencies in the 3D representation from the viewpoints of the user's eyes, especially with regard to the estimated depth of one or more objects in the physical environment. Thus, while usable for basic functions, these passthrough techniques make it difficult for a user to perform tasks or interact with objects in the physical environment (e.g., typing on a real keyboard, picking up a mobile phone from a table) while in the virtual environment. Further, the inaccuracies in the 3D representation may result in an aesthetically inconsistent experience due to warping of the displayed images.

Figure 2A:
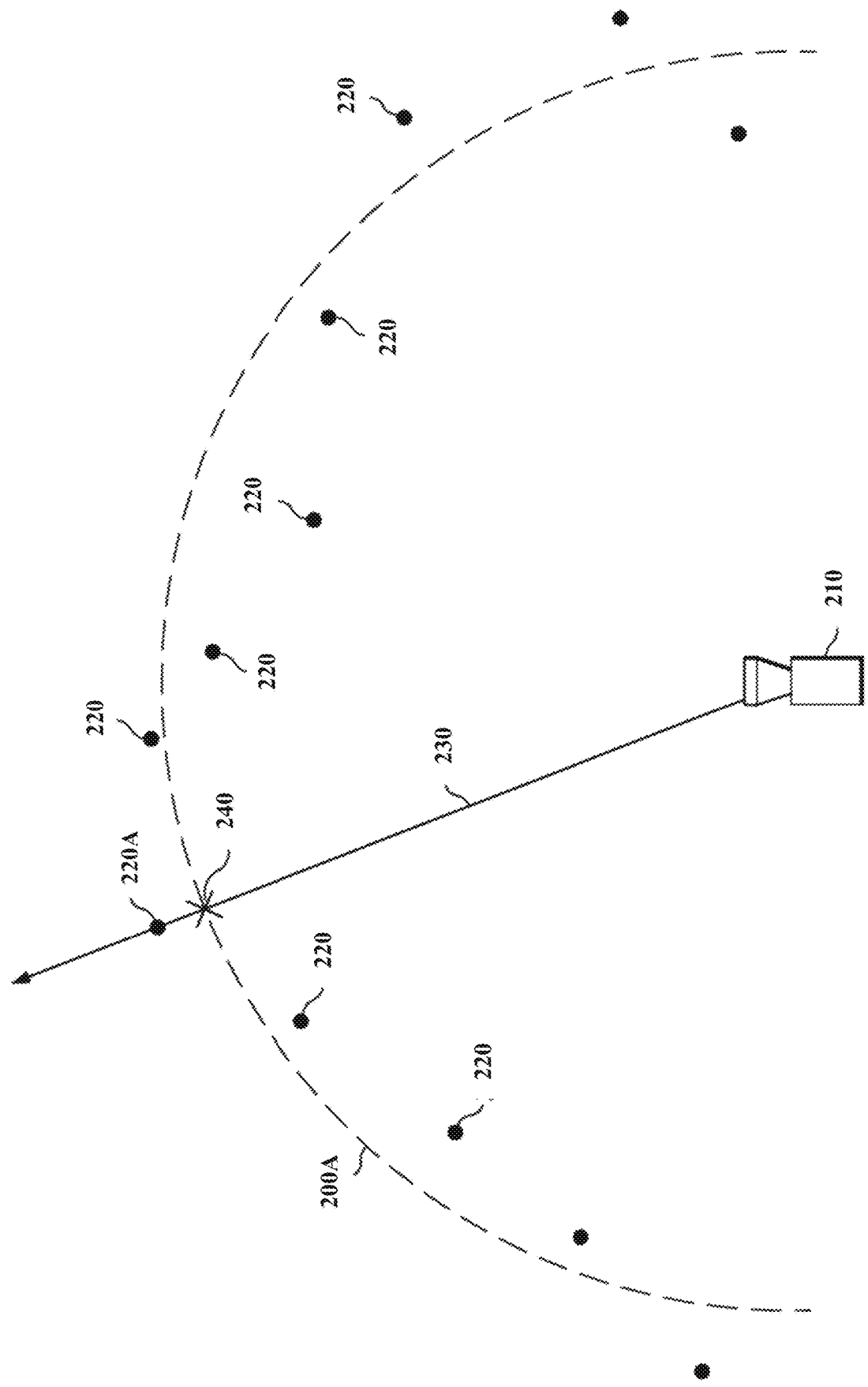

FIGS. 2A and 2B illustrate top-down visualizations of a 3D mesh being deformed to represent the contours of an observed environment. For clarity, the figures are drawn in 2D, but it should be understood that the 3D mesh is a 3D construct. FIG. 2A illustrates an embodiment of the 3D mesh 200A being initialized to be equal-distance (e.g., 1, 2, 2.5, or 3 meters) from a viewer 210 (represented by a camera). In the particular example being shown, the radius of the 3D mesh 200A is 2 meters. Since the 3D mesh 200A is equal-distance away from the viewer 210, it forms a hemisphere around the user. For clarity, FIG. 2A illustrates a portion of a cross-section of that hemisphere, resulting in the half-circle shown. FIG. 2A further illustrates points (e.g., 220) in the point cloud that are deemed reliable. These points 220 represent observed features in the environment and may be generated using the embodiments described elsewhere herein.

The 3D mesh 200A may be deformed according to the points 220 in order to model the contour of the environment. In particular embodiments, the 3D mesh 200A may be deformed based on the viewer's 210 position and the points 220 in the point cloud. To determine which portion of the 3D mesh 200A corresponds to each point in the point cloud 220, the computing device may cast a conceptual ray from the viewer's 210 position towards that point. Each ray would intersect with a primitive (e.g., a triangle or other polygon) of the 3D mesh. For example, FIG. 2A shows a ray 230 being cast from the viewer 210 towards point 220A. The ray 230 intersects the 3D mesh 200A at a particular location 240. As a result, mesh location 240 is deformed based on the depth value associated with the point 220A. For example, if the point 220 is 2.2 meters away from the viewer 210, the depth value associated with the mesh location 240 may be updated to become 2.2 meters from its initial value of 2 meters. FIG. 2B illustrates the deformed 3D mesh 200B that may result from the deformation process. At this point, the deformed mesh 200B represents the contour of the physical environment observed by the viewer 210.

Figure 3:
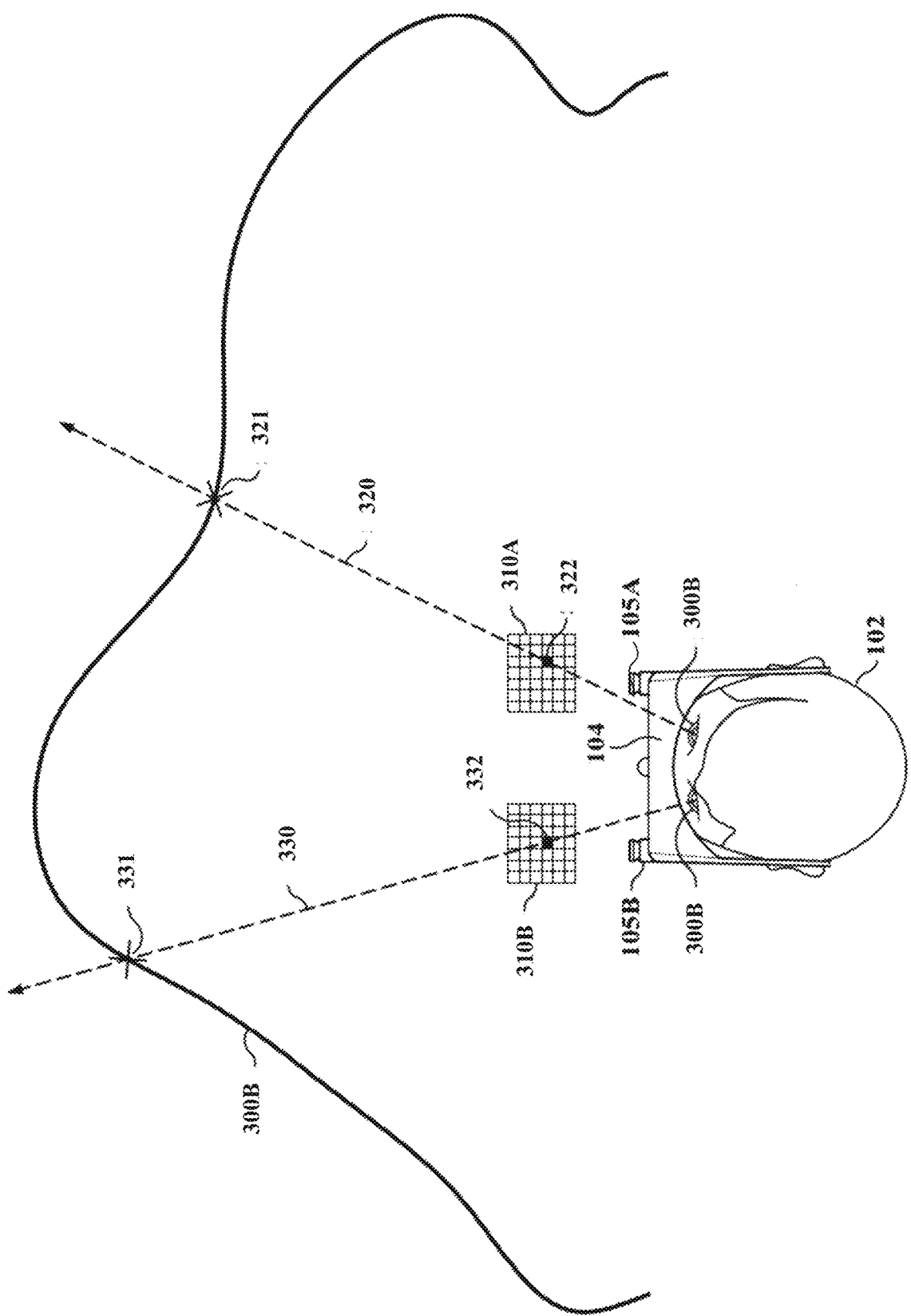
FIG. 3 provides an illustration of 3D-passthrough rendering based on the 3D mesh.

FIG. 3 provides an illustration of 3D-passthrough rendering based on the 3D mesh. In particular embodiments, the rendering system may determine the user's 102 current viewing position relative to the environment. In particular embodiments, the system may compute the pose of the HMD 104 using SLAM or other suitable techniques. Based on the known mechanical structure of the HMD 104, the system could then estimate the viewpoints of the user's eyes 300A and 300B using offsets from the pose of the HMD 104. In particular embodiments the computing system may determine a viewpoint that corresponds to a first eye of the user (e.g., a first viewpoint that corresponds to a right eye of the user). In particular embodiments the computing system may determine a viewpoint that corresponds to a second eye of the user (e.g., a second viewpoint that corresponds to a left eye of the user). One or more viewpoints may be determined by utilizing any of the sensor data or image data received by the computing system. A viewpoint of a particular eye may comprise a location, an orientation, and a field of view from the particular eye. In particular embodiments the location and orientation comprising the viewpoint may be represented using one or more coordinate systems, for example and not by way of limitation, via an absolute global coordinate system (e.g., x, y, z), or via a localized coordinate system relative to one or more components of artificial reality system, for example and not by way of limitation, the HMD 104.

The system may then render a passthrough image for each of the user's eyes 300A-B. For example, to render a passthrough image for the user's right eye 300A, the system may cast a ray 320 from the estimated viewpoint of the right eye 300A through each pixel of a virtual screen space 310A to see which portion of the mesh 300B the rays would intersect. This ray casting process may be referred to as a visibility test, as the objective is to determine what is visible from the selected viewpoint 300A. In the particular example shown, the ray 320 projected through a particular pixel 322 intersects with a particular point 321 on the mesh. This indicates that the point of intersection 321 is to be displayed by the pixel 322. Once the point of intersection 321 is found, the rendering system may sample a corresponding point in a texture image that is mapped to the point of intersection 321. In particular embodiments, the image captured by the cameras 105A-B of the HMD 104 may be used to generate a texture for the mesh 300B. Doing so allows the rendered image to appear more like the actual physical object. In a similar manner, the rendering system may render a passthrough image for the user's left eye 300B. In the example shown, a ray 330 may be cast from the left-eye viewpoint 300B through pixel 332 of the left screen space 310B. The ray 330 intersects the mesh 300B at location 331. The rendering system may then sample a texture image at a texture location corresponding to the location 331 on the mesh 300B and compute the appropriate color to be displayed by pixel 332. Since the passthrough images are re-rendered from the user's viewpoints 300A-B, the images would appear natural and provide proper parallax effect.

The present invention remedies the stability and resource requirements associated with updating the 3D mesh by defining a particular region or virtual surface, for example a plane or planar surface (hereinafter "virtual surface") in the virtual environment for displaying passthrough images (a "passthrough area"). When the virtual surface corresponds to, for example, a particular physical surface in the real environment that the user frequently interacts with (e.g., the user's desk, a tabletop, the user's hands, or a canvas on a wall), the computer system does not need to continuously calculate the depth of the passthrough area as the user moves throughout a three-dimensional environment, because the particular physical surface in the real environment remains at a fixed pose (e.g., location and orientation). Thus, in one embodiment the virtual surface may be located at a fixed pose (e.g., location and orientation) in the virtual environment that corresponds to or is associated with the pose of the particular physical surface. In this manner the pose of the virtual surface may be anchored with respect to the physical environment (e.g., the virtual surface is fixed to a physical tabletop). In particular embodiments the computing system requests the user to perform a one-time setup to specify anchor locations and determine a pose of the virtual surface (e.g., the user could designate a coordinate or the dimensions of the desk in the real environment using a controller).

In particular embodiments the surface geometry of the virtual surface may static and remain temporally fixed in the virtual environment, such that the user-defined virtual surface simply coincides with the location of a physical surface. Because the surface geometry is defined independently from the actual depth measurements on the corresponding physical surface (in contrast to the methods described in FIGS. 2 and 3), the virtual surface remains the same regardless of changes to the physical surface. For example, if the user relocates one or more objects located on the particular physical object or surface that corresponds to the virtual surface (e.g., the user picks up their phone off the tabletop), the surface geometry may remain constant. The computing system projects the passthrough images of random objects on the physical surface onto the virtual surface, regardless of the physical depth of the random objects.

By defining and fixing these parameters, the computing system can generate a corresponding virtual surface that is fixed in the virtual environment and provide temporally stable passthrough images for the user. With the virtual surface anchored within the virtual environment, the computing system can render and display passthrough images without having to continuously track and update the depth of the virtual surface as the user moves throughout the physical environment. Further, because the defined surface is virtual, the real surface can contain any number of real objects (which can also be moved on the surface) without the usual difficulty of updating and reconstructing a 3D representation or 3D mesh of the passthrough area and accompanying objects. This significantly improves the passthrough experience.

In particular embodiments the computing system may capture one or more images of the real environment (also referred to as the physical environment) and physical surroundings using a camera worn by the user. For example, the computing system may have a camera capture one or more images from a particular current perspective of the user. In particular embodiments the camera worn by the user is associated with an artificial reality device, for example a head-mounted device worn by the user that blocks the user from seeing the real environment directly. In one embodiment for generating passthrough images, a computing system may access one or more images of an environment captured by cameras 105A and 105B of a device worn by a user. The one or more images may include, for example, a particular physical surface that the user frequently interacts with (e.g., the user's desk, a tabletop, the user's hands, or a canvas on a wall) that was utilized to determine the virtual surface. The system may generate in some embodiments, based on the one or more images, depth measurements of one or more objects in the environment. In some embodiments, the system may generate a mesh covering a field of view of the user and then update the mesh based on the depth measurements to represent a contour of the objects in the environment.

In particular embodiments the computing system may determine a pose of each of the one or more cameras 105A and 105B when the image was captured. The camera pose may be determined by utilizing any of the sensor data or image data received by the computing system, for example, image or sensor data received by the HMD 104 of the user. In particular embodiments the camera pose may be determined based on a known spatial relationship between the pose of the one or more cameras and the pose of one or more components of the artificial reality system, for example the HMD 104. Based on, for example, the pose of the HMD 104, the computing system may further determine the pose of either of the cameras 105A and 105B or either a pose of one or more of the user's eyes. The camera pose may comprise a location and an orientation of the camera. In particular embodiments the location and orientation comprising the camera pose may be represented using one or more coordinate systems, for example and not by way of limitation, via an absolute global coordinate system (e.g., x, y, z), or via a localized coordinate system relative to one or more components of artificial reality system, for example and not by way of limitation, the HMD 104 or the one or more controllers 106.

Figure 4:
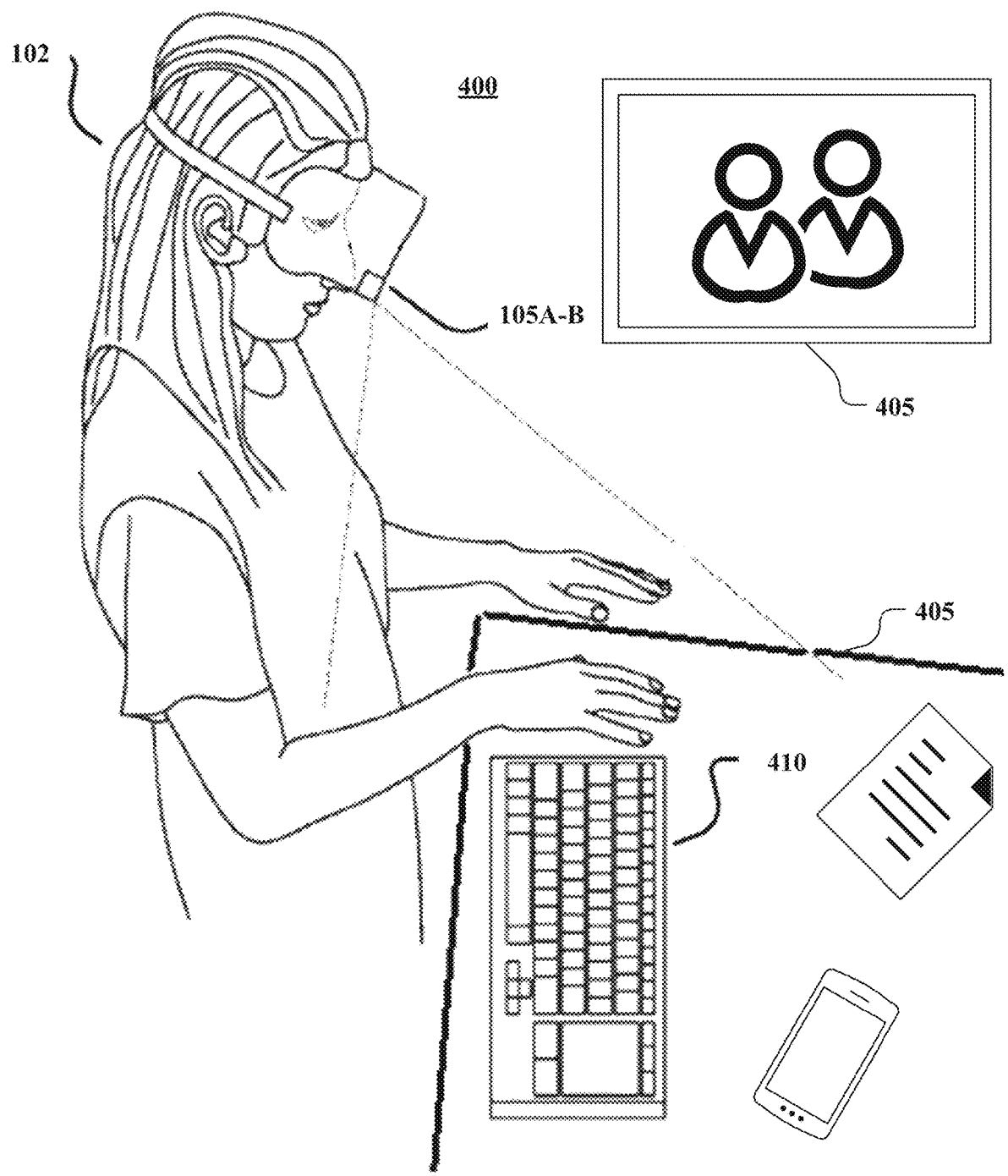
FIG. 4 illustrates one or more cameras associated with the artificial reality device of a user capturing the physical environment of the user.

FIG. 4 illustrates one or more cameras associated with the artificial reality device of a user capturing the physical environment of the user. The physical environment 400 may contain one or more physical surfaces 405 that could be utilized to define a virtual surface according to the methods described herein, for example a tabletop or a painting as depicted in FIG. 4. The one or more physical surfaces 405 may further include one or more objects the user wishes to interact with, for example a keyboard, cell phone, or documents as depicted in FIG. 4. As the user moves through the physical environment, the one or more cameras 105A-B may capture one or more images of the physical environment. The computing system may display these one or more images to assist the user in defining one or more anchor locations or virtual surfaces.

Figure 5:
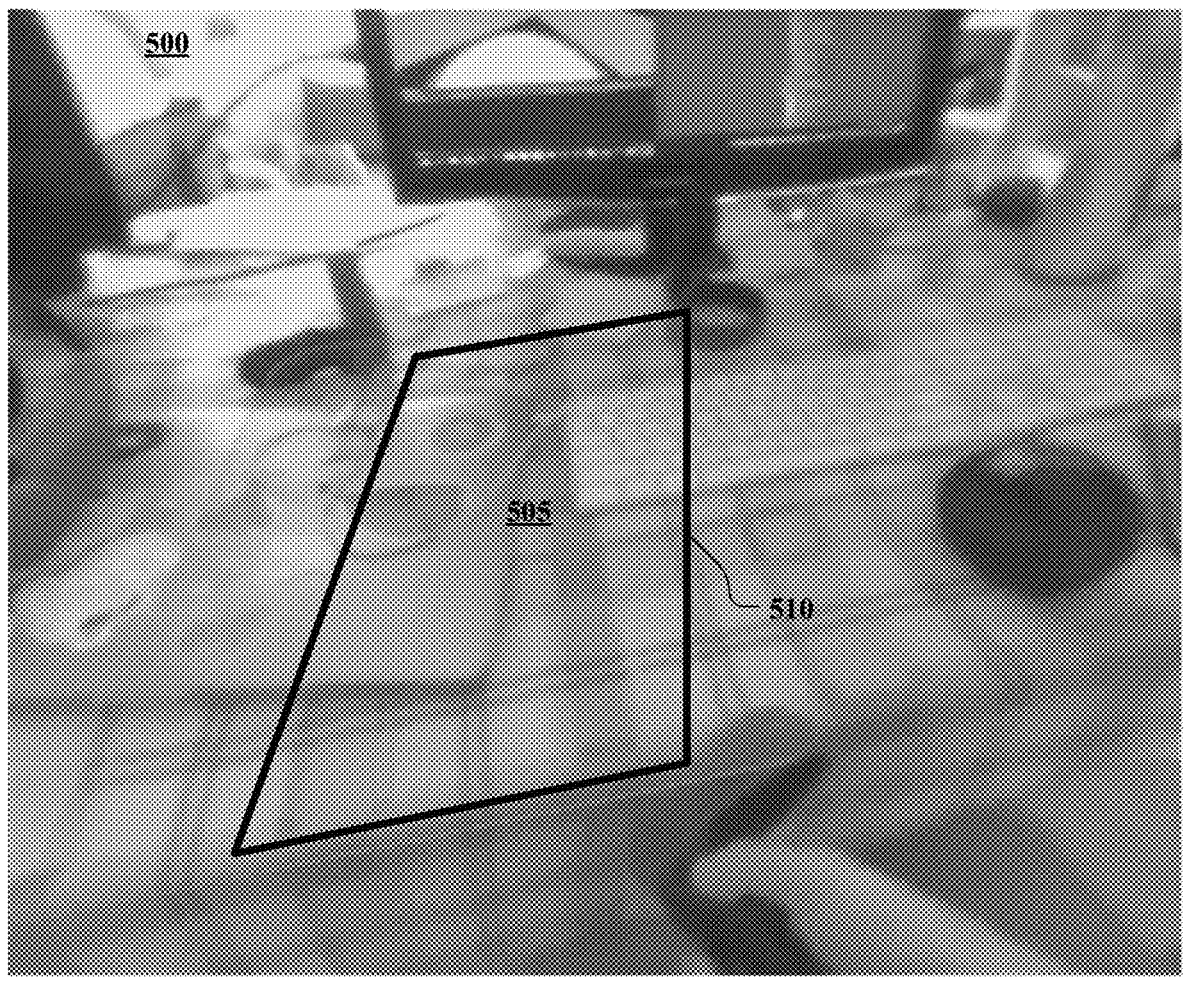
FIG. 5 illustrates a first-person perspective of a user defining a virtual surface for displaying passthrough images in a three-dimensional environment.

FIG. 5 illustrates a first-person perspective of a user defining a virtual surface for displaying passthrough images in a three-dimensional environment. In particular embodiments the computing system may determine one or more poses or anchor locations in order to generate a virtual surface. For example, the computing system may display one or more images 500 to the user of an artificial reality system, where the images 500 represent the physical environment while the user is wearing HMD 104. By viewing their physical environment, the user or computing system can identify and determine one or more anchor locations 510 (e.g., one or more coordinates, lines, or perimeters) to define a virtual surface 505 with which to render and display passthrough images. In particular embodiments, the anchor locations and corresponding virtual surface 505 may correspond to a location or orientation of a particular physical surface in the real environment. In particular embodiments, the virtual surface may be determined by a defined dimension, area, contour, or orientation (e.g., the user may define a virtual surface that is a rectangle with dimensions 2 feet by 3 feet).

In particular embodiments, the computing system may determine and designate the one or more coordinates of the virtual surface 505 based on the computing system tracking one or more motions performed by the user. As depicted in FIG. 5, the user defines the virtual surface 505 by using one or more motions to define or trace one or more anchor locations 510 (e.g., a perimeter of the virtual surface). These one or more motions may be performed, for example and not by way of limitation, by hand motions or eye motions that are tracked by the computing system. The one or more motions may be further associated with an interaction with one or more controllers 106, for example, movements with the controllers or input received through one or more buttons or mechanical input mechanisms. The motions for designating one or more anchor locations 510 may comprise, for example and not by way of limitation, placing a hand or controller at a particular coordinate or pointing at or selecting a particular coordinate in the three-dimensional environment. The motions for determining one or more dimensions may comprise, for example and not by way of limitation, using a hand or controller to trace a length width or height, or tracing a perimeter of an area (e.g., tracing, click-and-drag, or drag-select motions). In particular embodiments the computing system may render and display one or more icons, images, or representations overlaid over the passthrough images 500 so the user can visualize the virtual surface 505 and one or more anchor locations 510 as they are defined.

In particular embodiments the one or more anchor locations 510 or dimensions may be determined using computing vision techniques. Based on, for example and not by way of limitation, an image captured from a viewpoint in the environment, a computer system may recognize objects (e.g., an art canvas, a desk, etc.) or portions of objects (e.g., the corner of a table) in the image and compute depth information to determine the locations of the one or more objects or portions of objects in the three-dimensional environment. With the accurate locations of the objects in the three-dimensional environment, the system may perform a variety of functions, such as determining one or more poses of objects (e.g., a location and orientation in the three-dimensional space) or anchor locations 510 (e.g., one or more coordinates, lines, or perimeters) within a three-dimensional space in order to determine a virtual surface for rendering and displaying passthrough images.

In particular embodiments the one or more anchor locations may represent a location in the real environment that remains at a fixed (i.e., "anchored") position and orientation over time. One or more anchor locations may comprise one or more coordinates, a dimension (e.g., a length), an area, or a volume. The one or more anchor locations may be represented by one or more coordinate systems in the three-dimensional space, for example and not by way of limitation, via an absolute global coordinate system (e.g., x, y, z) or via a localized coordinate system relative to one or more objects in the three-dimensional space.

In particular embodiments the one or more anchor locations correspond to a location of one or more objects, regions, or surfaces in the real environment (e.g., one or more anchor locations may correspond to the corner of a desk, a length of a wall, a masking canvas area, etc.). For example and not by way of limitation, the computing system may determine a coordinate that corresponds to the corner of a table, or an area of the surface of a desk. In particular embodiments the computing system may use the one or more coordinates or dimensions to determine the one or more anchor locations for determining the virtual surface.

In particular embodiments the computing system may generate a virtual surface 505 or volume in the three-dimensional space. This virtual surface 505 may be generated based on the one or more of the anchor locations determined according to the methods described herein. In particular embodiments the position, orientation, shape, contour, or dimensions of the virtual surface 505 may remain at a fixed (i.e., "anchored") position and orientation over time. These fixed properties may correspond to one or more of the defined anchor locations, or one or more objects in the physical environment (e.g., a virtual surface with defined 3 feet by 2 feet rectangular dimensions may correspond to a rectangular table top in the physical environment with the same dimensions). The generated virtual surface 505, which remains fixed in the three-dimensional space by the computing system, allows for temporal stability when projecting the passthrough images, as the defined location and corresponding depth of the 3D surface relative to the user and HMD 104 need not be constantly estimated and updated.

Figure 6A:
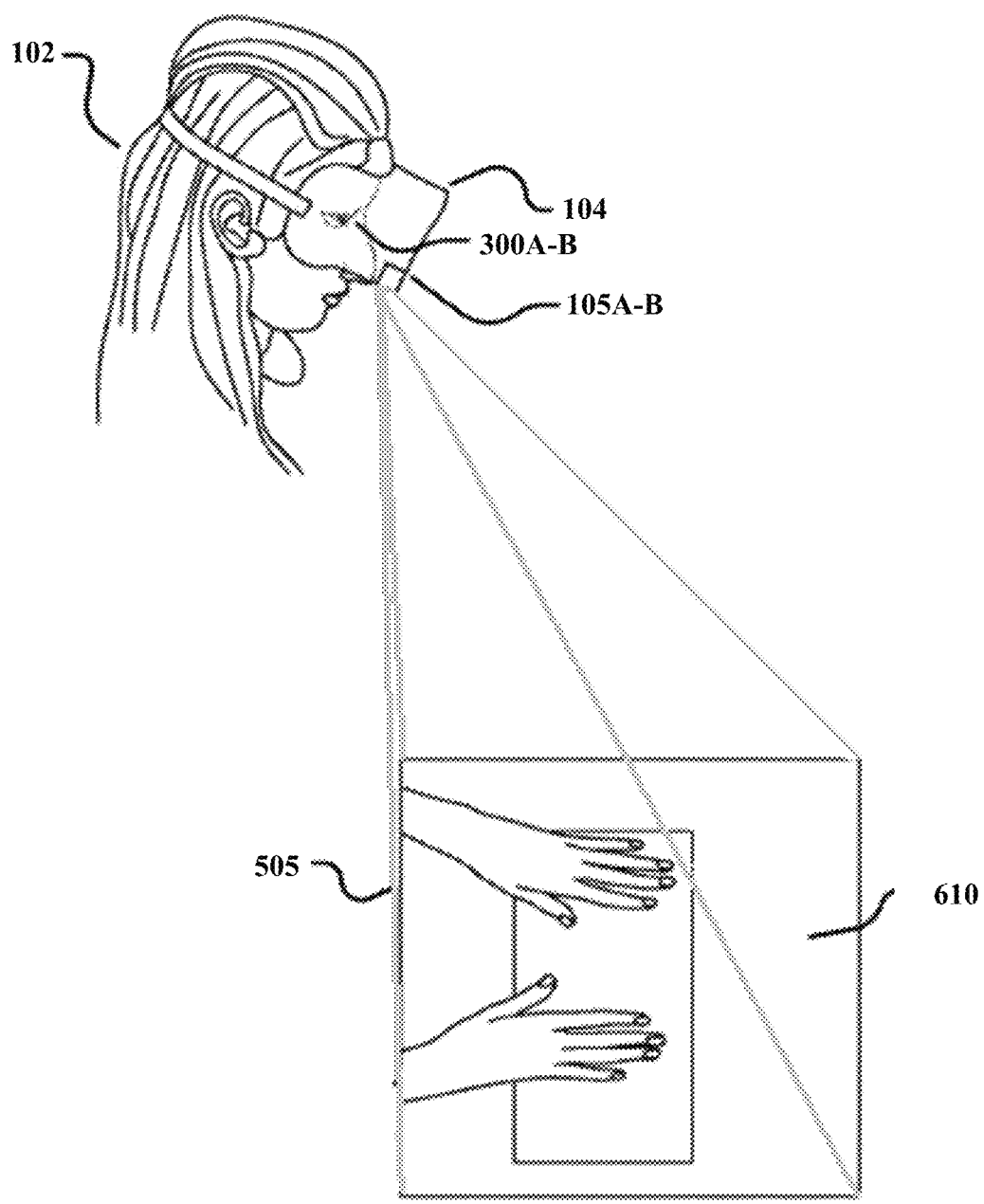
FIG. 6A illustrates rendering one or more output passthrough images on the virtual surface.

In particular embodiments, the computing system may utilize the virtual surface to render one or more output passthrough images for the virtual surface. FIG. 6A illustrates rendering one or more output passthrough images on the virtual surface. In particular embodiments the computing system may receive one or more images captured by the cameras 105A-B to render one or more passthrough images from the perspective of the camera 610 on the virtual surface. The computing system may receive one or more images to determine one or more regions in the one or more images that, as viewed from the pose of the cameras 105A or 105B, corresponds to the virtual surface when viewed from the perspective of the user of the HMD 104. In particular embodiments this determination may be based on, for example, the known spatial relationships between, for example, the pose of the one or more cameras on the HMD 104, the pose of the user 102 or the HMD 104, or the pose of the one or more anchor locations or virtual surface. For example, if the user turns their head such that the virtual surface 505 is now on the peripheral of one or more images captured by the cameras 105A or 105B, the computing system may use the pose of the HMD 104 or the one or more cameras 105A or 105B relative to the pose of the anchor locations or virtual surface 505 to ensure the passthrough images remain properly projected onto the corresponding regions of virtual surface. This may require the computing system to determine a camera or HMD 104 pose associated with an image, and use the spatial properties of this pose (e.g., the location, orientation, and field-of-view) to determine a region of the image contains at least a portion of the virtual surface. As another example, in particular embodiments this determination of a region of the images that correspond to the virtual surface can be based on one or more computer vision techniques (e.g., object recognition). In particular embodiments the computing system may further render one or more pixels to the virtual surface 505 to map the geometry to the image information to, for example, generate texture for the virtual surface.

Figure 6B:
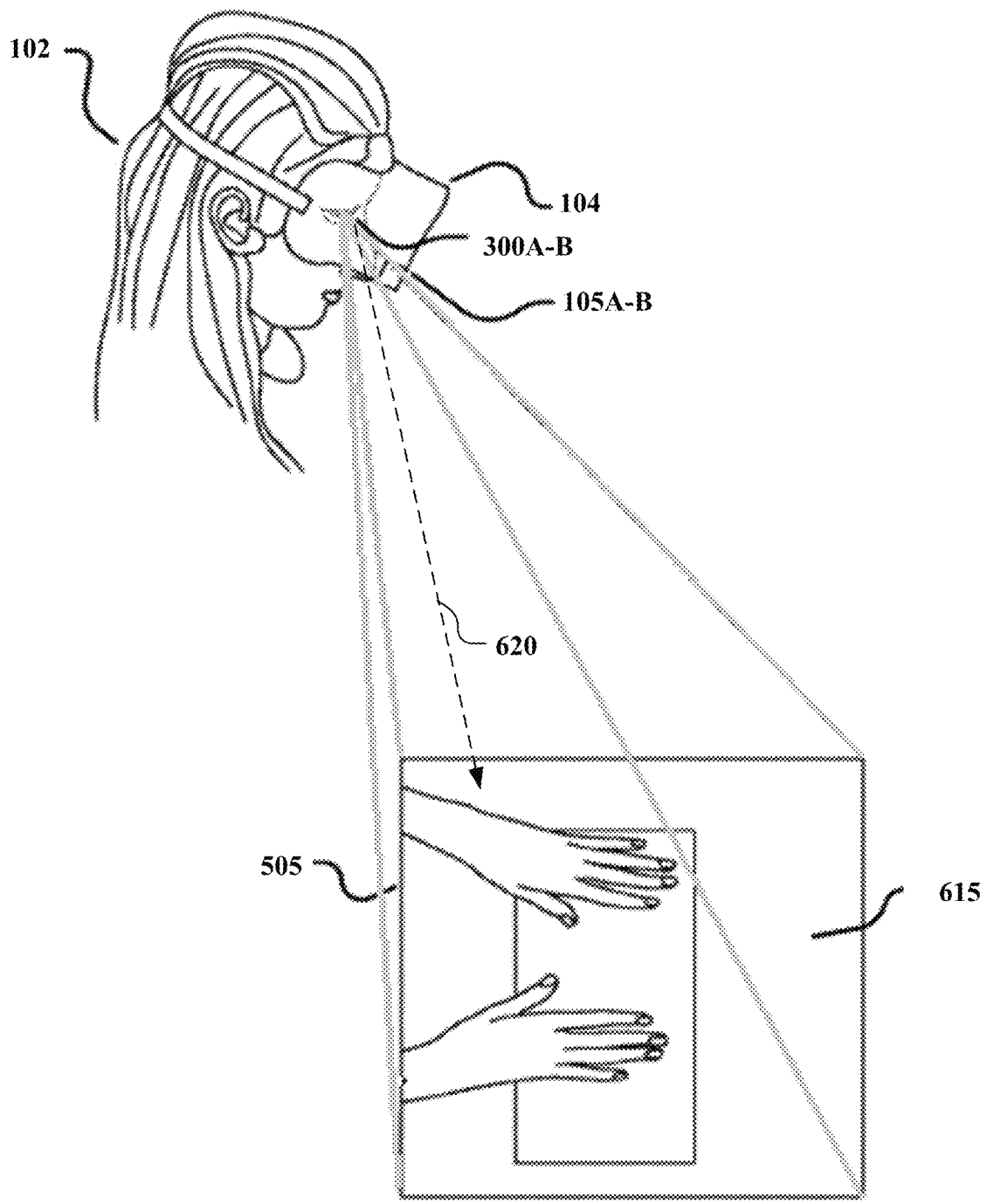
FIG. 6B illustrates rendering one or more passthrough images on the virtual surface from the perspective of a user's eyes.

However, in order to provide the correct perspective, the computing system must render the output passthrough images from the perspective of the user's eyes 500A-B. FIG. 6B illustrates rendering one or more passthrough images on the virtual surface from the perspective of a user's eyes. If the computing system simply displayed the one or more rendered images 610 from the perspective of the cameras 500A-B, the projected images would not provide the user 102 with an accurate view of the physical environment. Thus, the computing system may render one or more passthrough images from the perspective of the user's eyes 615. In particular embodiments the computing system may render a first output passthrough image from the perspective of the user's eyes based on (1) a first viewpoint or perspective from a first eye of the user relative to the virtual surface and (2) the image region corresponding to the virtual surface. In particular embodiments the computing system may render a second output image based on (1) a second viewpoint or perspective from a second eye relative to the virtual surface and (2) the image region corresponding to the virtual surface. When the system renders a one or more output passthrough images from the perspective of the user's eyes 615 for display, the system may perform visibility tests from the perspectives of the user's eyes. For example, the system may cast one or more rays 620 into the 3D space from a viewpoint that corresponds to each eye of the user. In this manner, the rendered images 615 that are displayed to the user would be computed from the perspective of the user's eyes, rather than from the perspective of the external-facing cameras 105A-B.

Figure 7:
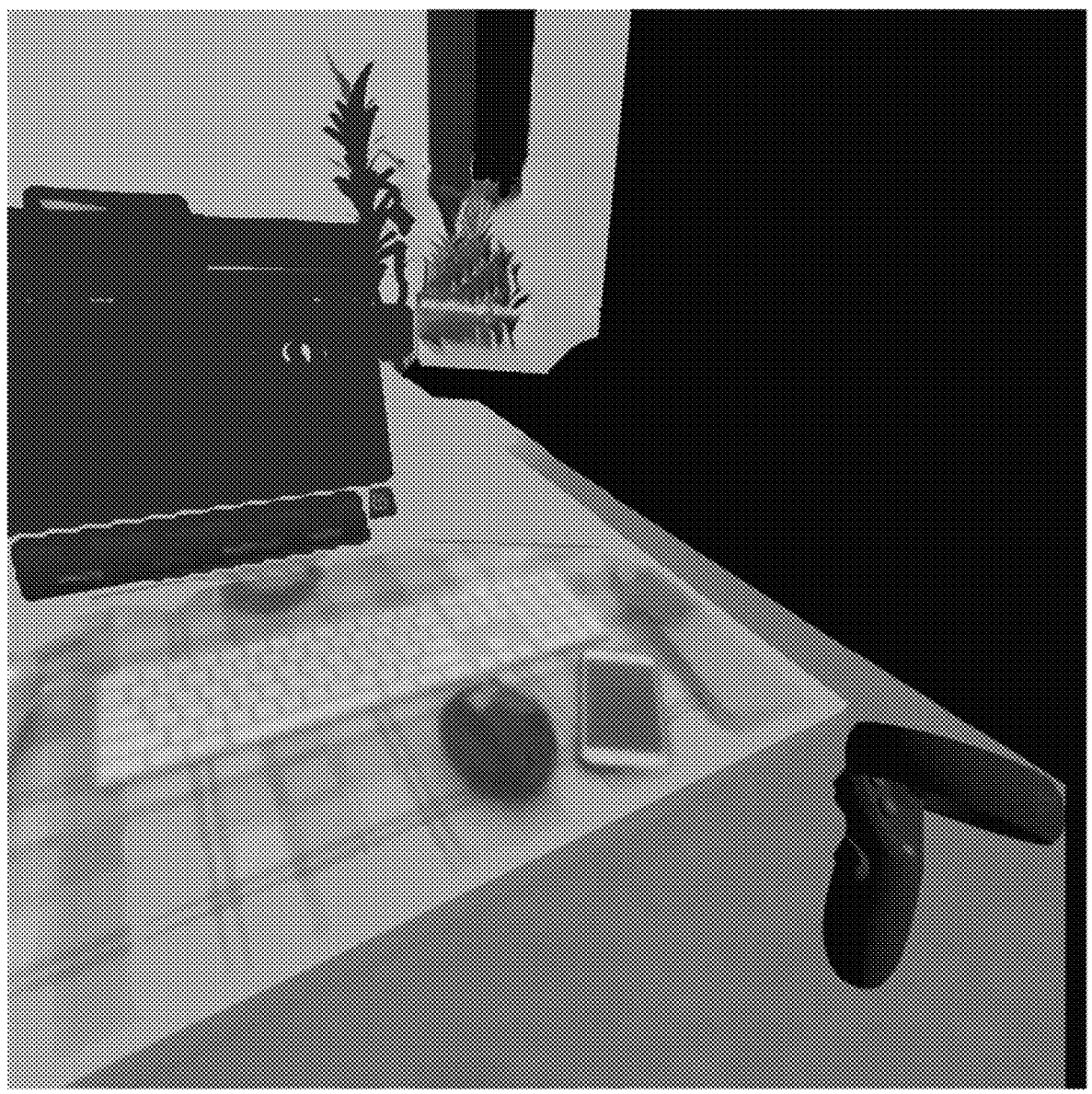
FIG. 7 illustrates one or more passthrough images displayed on a device display associated with a user.

In particular embodiments the computing system may display the passthrough images on a device display associated with a user, for example an HMD 104 display. FIG. 7 illustrates one or more passthrough images displayed on a device display associated with a user. In particular embodiments a first output image (e.g., a left eye image) may be displayed on a first display (e.g., a left eye display) of the device configured to be viewed by the first eye (e.g., the left eye) of the user, and a second output image (e.g., a right eye image) may be displayed on a second display (e.g., a right eye display) of the device configured to be viewed by the second eye (e.g., the right eye) of the user. In particular embodiments the computing system may display passthrough images outside the virtual surface. For example, if the virtual surface corresponds to a table in the real environment, the computing system may display the passthrough images on the virtual surface, as well as passthrough images for the surrounding walls, floor, etc. Passthrough images outside the virtual surface may be rendered and displayed according to the methods described in U.S. application Ser. No. 16/746,128, filed Jul. 24, 2020, entitled "Systems, Methods, and Media for Generating Visualization of Physical Environment in Artificial Reality," hereby incorporated by reference in its entirety.

Figure 8A:
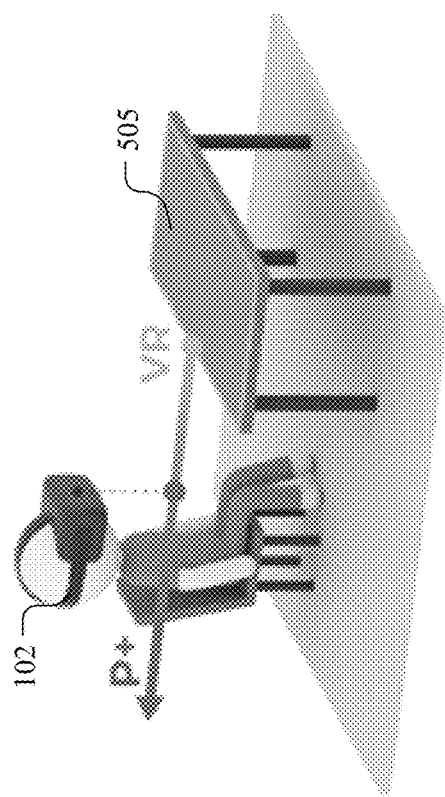
FIGS. 8A-8C illustrate selectively displaying passthrough images based on a location or orientation of an artificial reality device.
Figure 8C:
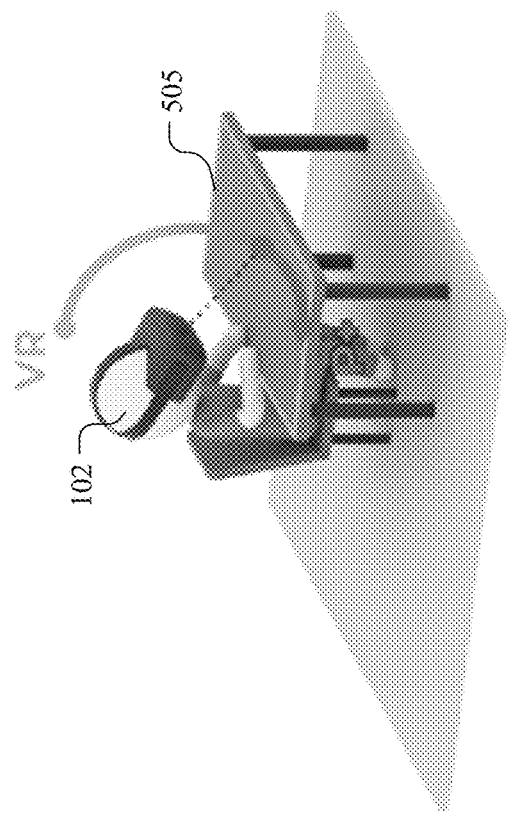
Figure 8B:
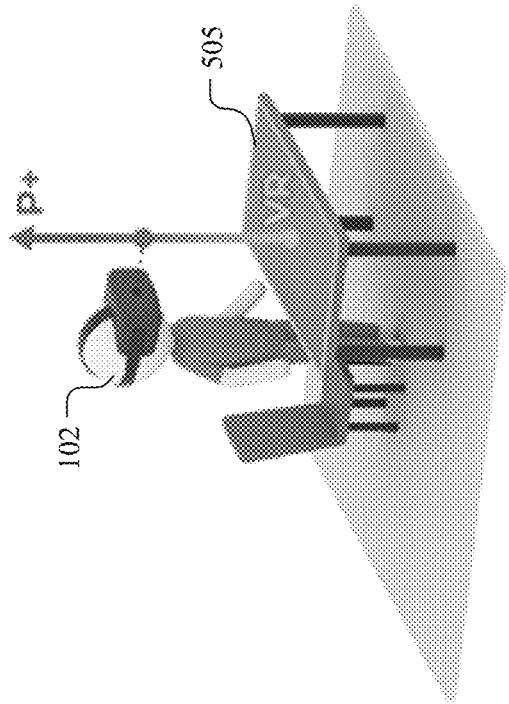

In particular embodiments the display of the passthrough images may be based on a location or orientation of the HMD 104 or user wearing the HMD 104. FIGS. 8A-8C illustrate selectively displaying passthrough images based on a location or orientation of the HMD 104. The computing system may determine a location or orientation of the HMD 104, user 102, or cameras 105A and 105B and, based on the distance of the HMD 104, user 102, or cameras 105A and 105B from the virtual surface 505, determine whether to display the passthrough images on a device display associated with the user.

As depicted in FIG. 8A, in particular embodiments the passthrough images may be displayed based on a horizontal distance of the HMD 104, user 102, or cameras 105A and 105B from the virtual surface 505, for example a minimum horizontal threshold distance. For example, if virtual surface 505 represents a table in the real environment, user 102 may only be interested in viewing the passthrough images of the table when they are within a certain horizontal proximity from the table (e.g., when the user moves away from their work station). In these embodiments the computing system may determine a horizontal distance of the HMD 104, user 102, or cameras 105A and 105B from the virtual surface 505, based on for example, sensor data or image data received by the computing system, and selectively display the one or more passthrough images based on this horizontal distance from virtual surface 505. Although FIG. 8A depicts only displaying passthrough images when the user 102 exceeds a minimum horizontal threshold distance from virtual surface 505, in particular embodiments the computing system may only display passthrough images when the user 102 is within a minimum horizontal threshold distance from virtual surface 505.

As depicted in FIG. 8B, in particular embodiments the passthrough images may be displayed based on a vertical distance of the HMD 104, user 102, or cameras 105A and 105B from the virtual surface 505, for example a minimum vertical threshold distance. For example, if virtual surface 505 represents a table in the real environment, user 102 may only be interested in viewing the passthrough images of the table when they exceed a certain vertical proximity from the table (e.g., when the user stands up from sitting at their workstation). In these embodiments the computing system may determine a vertical distance of the HMD 104, user 102, or cameras 105A and 105B from the virtual surface 505, based on for example, sensor data or image data received by the computing system, and selectively display the one or more passthrough images based on this vertical distance from virtual surface 505. Although FIG. 8B depicts only displaying passthrough images when the user 102 exceeds a minimum vertical threshold distance from virtual surface 505, in particular embodiments the computing system may only display passthrough images when the user 102 is within a minimum vertical threshold distance from virtual surface 505.

As depicted in FIG. 8C, in particular embodiments the passthrough images may be displayed based on an orientation of the HMD 104, user 102, or cameras 105A and 105B relative to the virtual surface 505, for example a minimum threshold orientation. For example, if virtual surface 505 represents a table in the real environment, user 102 may only be interested in viewing the passthrough images of the table when they are looking downwards towards the table, or when the table is within the field of view of the user (e.g., when the user looks down at an object on the table). As another example, when the user tilts his head down to look at his own body (e.g., to reach into his pocket), the portion of his field-of-view that intersects a defined volume around his body would display the corresponding passthrough images based on the current view or field of view of the user. In these embodiments the computing system may determine an orientation of the HMD 104, user 102, or cameras 105A and 105B relative to the virtual surface 505 (e.g., whether the user is looking at the virtual surface, whether the camera field of view includes the virtual surface or real object, etc.), based on for example, sensor data or image data received by the computing system, and selectively display the one or more passthrough images based on this orientation of the HMD 104, user 102, or cameras 105A and 105B relative to the virtual surface 505. Although FIG. 8C depicts only displaying passthrough images when the orientation of the view of user 102 is within a minimum threshold orientation relative to the virtual surface 505, in particular embodiments the computing system may only display passthrough images when the orientation of the view of user 102 exceeds the minimum threshold orientation relative to the virtual surface 505.

In particular embodiments, the computing system may apply one or more visual effects to enhance the display of the one or more passthrough images to the user. For example, the computing system may utilize the methods described herein to determine one or more regions of the image that correspond to the virtual surface, and only display the regions of the image to the user that correspond to the virtual surface (e.g., if the virtual surface represents a table in the real environment, the computing system may omit from display the regions of the image that correspond to, for example, the floor immediately adjacent to the table). As another example, in particular embodiments the computing system may use shading or other visual techniques to create a gradual gradient between the passthrough images and the virtual environment. As yet another example, in particular embodiments the display of the passthrough images may gradually fade in or fade out based on the proximity of the user, HMD 104, or cameras 105A and 105B from the virtual surface as illustrated in FIGS. 8A-8C and outlined above (e.g., rather than abruptly display the passthrough images when the user exceeds the minimum horizontal threshold distance, the computing system may gradually fade the passthrough images in or out as the user approaches the minimum horizontal threshold distance).

Figure 9:
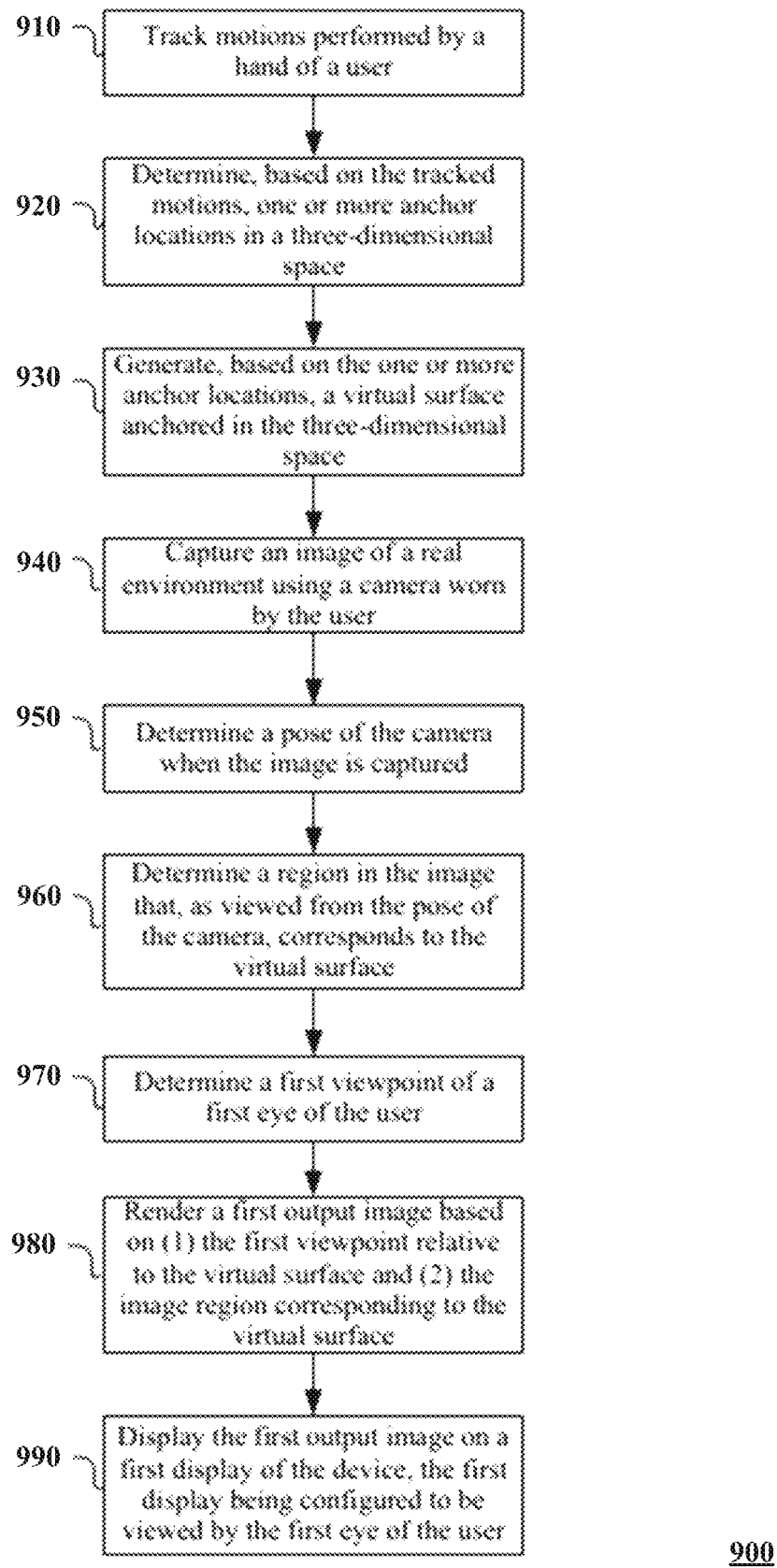
FIG. 9 illustrates an example method for displaying stabilized images of a real environment in artificial reality.

FIG. 9 illustrates an example method 900 for displaying stabilized images of a real environment in artificial reality. The method may begin at step 910, where a computing system tracks motions performed by a hand of a user. The one or more motions may be further associated with an interaction with one or more controllers 106, for example, movements with the controllers or input received through one or more buttons or mechanical input mechanisms.

At step 920, the computing system determines, based on the tracked motions, one or more anchor locations in a three-dimensional space. An anchor location may represent a location in the three-dimensional space that remains at a fixed (i.e., "anchored") position and orientation over time. One or more anchor locations may comprise one or more coordinates, a dimension (e.g., a length), an area, or a volume. In particular embodiments the one or more anchor locations correspond to a location of one or more objects in the real environment (e.g., an anchor location may correspond to the corner of a desk, a length of a wall, a masking canvas area, etc.).

At step 930, the computing system generates, based on the one or more anchor locations, a virtual surface anchored in the three-dimensional space. In particular embodiments the virtual surface may remain at a fixed (i.e., "anchored") position and orientation over time. This fixed position and orientation may correspond to the position and orientation of the one or more anchor locations, or physical objects in the real environment. The generated virtual surface, which remains fixed in the three-dimensional space by the computing system, allows for temporal stability when projecting the passthrough images, as the defined location and corresponding depth of the 3D surface relative to the user and HMD 104 need not be constantly estimated and updated.

At step 940, the computing system captures an image of a real environment using a camera worn by the user. The camera may be associated with a device worn by the user (e.g., an HMD 104) that blocks the user from seeing the environment directly. The images may be stereo image pairs captured simultaneously by two cameras with a shared field of view.

At step 950, the computing system determines a pose of the camera when the image is captured. The camera pose may be determined by utilizing any of the sensor data or image data received by the computing system. In particular embodiments the camera pose may be determined based on a known spatial relationship between the pose of the camera and the pose of one or more components of the artificial reality system, for example the HMD 104.

At step 960, the computing system determines a region in the image that, as viewed from the pose of the camera, corresponds to the virtual surface. In particular embodiments this determination may be based on, for example, the known spatial relationships between, for example, the pose of the one or more cameras on the HMD 104, the pose of the user or HMD 104, and the pose of the one or more anchor locations or virtual surface. As another example, in particular embodiments this determination can be based on one or more computer vision techniques (e.g., object recognition).

At step 970, the computing system determines a first viewpoint of a first eye of the user (e.g., the right eye). In embodiments where the HMD 104 has one display per eye, the system may further determine a second viewpoint of a second eye of the user (e.g., the left eye). At step 980, the computing system renders a first output image based on the first viewpoint relative to the virtual surface and the image region corresponding to the virtual surface. If a second output image is desired for the user's other eye, the system may further render the second output image based on the second viewpoint relative to the virtual surface and the image region corresponding to the virtual surface.

At step 990, the computing system displays the first output image on a first display of the device and/or the second output image on a second display of the device. The first display is configured to be viewed by the first eye of the user and the second display is configured to be viewed by the second eye of the user.

Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for displaying stabilized images of a real environment in artificial reality including the particular steps of the method of FIG. 9, this disclosure contemplates any suitable method for displaying stabilized images of a real environment in artificial reality including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10:
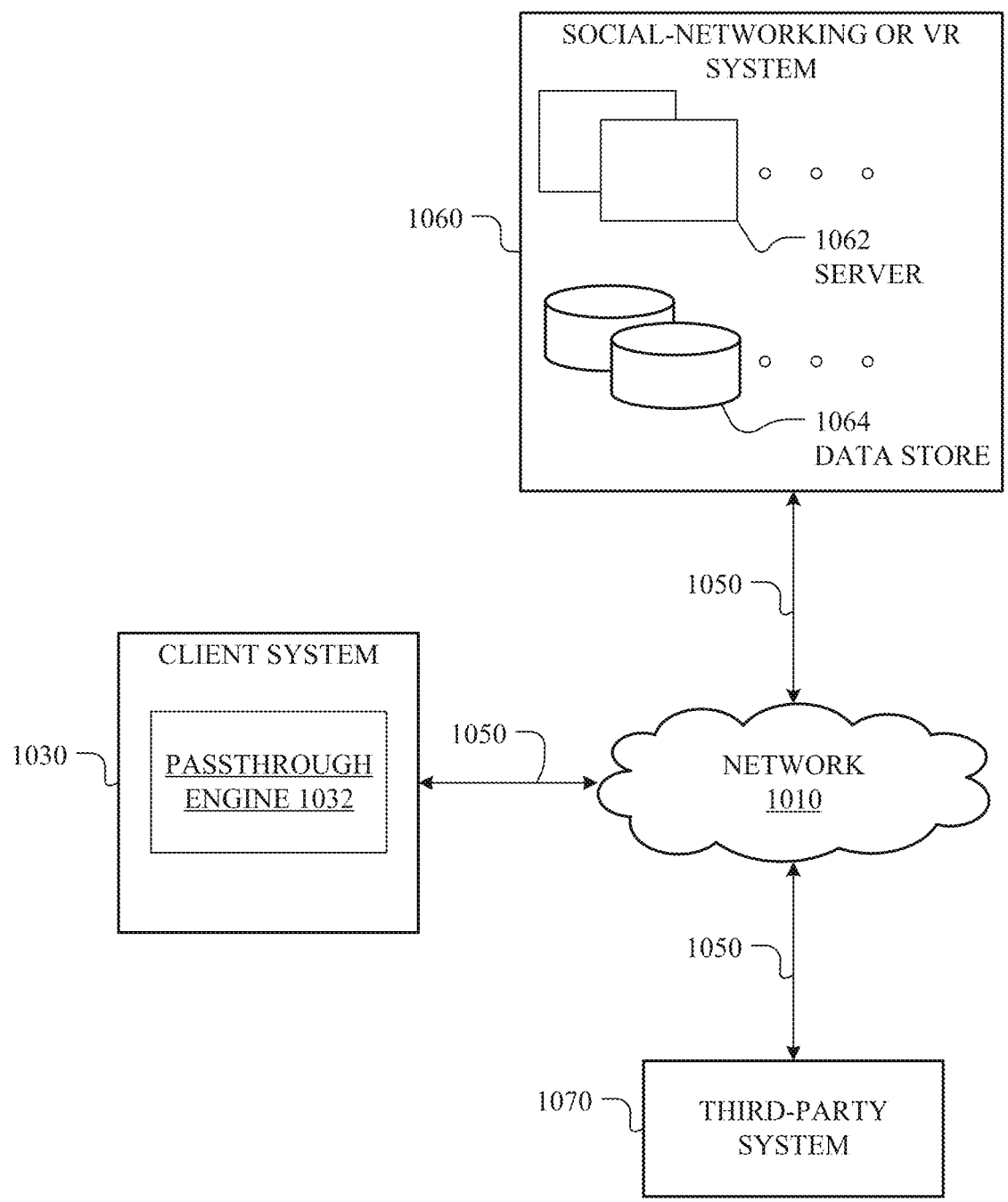
FIG. 10 illustrates an example network environment associated with a social-networking system.

FIG. 10 illustrates an example network environment 1000 associated with a social-networking system. Network environment 1000 includes a client system 1030, a social-networking system 1060, and a third-party system 1070 connected to each other by a network 1010. Although FIG. 10 illustrates a particular arrangement of client system 1030, social-networking system 1060, third-party system 1070, and network 1010, this disclosure contemplates any suitable arrangement of client system 1030, social-networking system 1060, third-party system 1070, and network 1010. As an example and not by way of limitation, two or more of client system 1030, social-networking system 1060, and third-party system 1070 may be connected to each other directly, bypassing network 1010. As another example, two or more of client system 1030, social-networking system 1060, and third-party system 1070 may be physically or logically co-located with each other in whole or in part. Moreover, although FIG. 10 illustrates a particular number of client systems 1030, social-networking systems 1060, third-party systems 1070, and networks 1010, this disclosure contemplates any suitable number of client systems 1030, social-networking systems 1060, third-party systems 1070, and networks 1010. As an example and not by way of limitation, network environment 1000 may include multiple client system 1030, social-networking systems 1060, third-party systems 1070, and networks 1010.

This disclosure contemplates any suitable network 1010. As an example and not by way of limitation, one or more portions of network 1010 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1010 may include one or more networks 1010.

Links 1050 may connect client system 1030, social-networking system 1060, and third-party system 1070 to communication network 1010 or to each other. This disclosure contemplates any suitable links 1050. In particular embodiments, one or more links 1050 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 1050 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1050, or a combination of two or more such links 1050. Links 1050 need not necessarily be the same throughout network environment 1000. One or more first links 1050 may differ in one or more respects from one or more second links 1050.

In particular embodiments, client system 1030 may be an electronic device including hardware, software, or embedded logic components or a combination of two or more such components and capable of carrying out the appropriate functionalities implemented or supported by client system 1030. As an example and not by way of limitation, a client system 1030 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 1030. A client system 1030 may enable a network user at client system 1030 to access network 1010. A client system 1030 may enable its user to communicate with other users at other client systems 1030.

In particular embodiments, client system 1030 may include a web browser 1032, and may have one or more add-ons, plug-ins, or other extensions. A user at client system 1030 may enter a Uniform Resource Locator (URL) or other address directing the web browser 1032 to a particular server (such as server 1062, or a server associated with a third-party system 1070), and the web browser 1032 may generate a Hyper Text Transfer Protocol (HTTP) request and communicate the HTTP request to server. The server may accept the HTTP request and communicate to client system 1030 one or more Hyper Text Markup Language (HTML) files responsive to the HTTP request. Client system 1030 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts, combinations of markup language and scripts, and the like. Herein, reference to a webpage encompasses one or more corresponding webpage files (which a browser may use to render the webpage) and vice versa, where appropriate.

In particular embodiments, social-networking system 1060 may be a network-addressable computing system that can host an online social network. Social-networking system 1060 may generate, store, receive, and send social-networking data, such as, for example, user-profile data, concept-profile data, social-graph information, or other suitable data related to the online social network. Social-networking system 1060 may be accessed by the other components of network environment 1000 either directly or via network 1010. As an example and not by way of limitation, client system 1030 may access social-networking system 1060 using a web browser 1032, or a native application associated with social-networking system 1060 (e.g., a mobile social-networking application, a messaging application, another suitable application, or any combination thereof) either directly or via network 1010. In particular embodiments, social-networking system 1060 may include one or more servers 1062. Each server 1062 may be a unitary server or a distributed server spanning multiple computers or multiple datacenters. Servers 1062 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 1062 may include hardware, software, or embedded logic components or a combination of two or more such components for carrying out the appropriate functionalities implemented or supported by server 1062. In particular embodiments, social-networking system 1060 may include one or more data stores 1064. Data stores 1064 may be used to store various types of information. In particular embodiments, the information stored in data stores 1064 may be organized according to specific data structures. In particular embodiments, each data store 1064 may be a relational, columnar, correlation, or other suitable database. Although this disclosure describes or illustrates particular types of databases, this disclosure contemplates any suitable types of databases. Particular embodiments may provide interfaces that enable a client system 1030, a social-networking system 1060, or a third-party system 1070 to manage, retrieve, modify, add, or delete, the information stored in data store 1064.

In particular embodiments, social-networking system 1060 may store one or more social graphs in one or more data stores 1064. In particular embodiments, a social graph may include multiple nodes—which may include multiple user nodes (each corresponding to a particular user) or multiple concept nodes (each corresponding to a particular concept)—and multiple edges connecting the nodes. Social-networking system 1060 may provide users of the online social network the ability to communicate and interact with other users. In particular embodiments, users may join the online social network via social-networking system 1060 and then add connections (e.g., relationships) to a number of other users of social-networking system 1060 to whom they want to be connected. Herein, the term "friend" may refer to any other user of social-networking system 1060 with whom a user has formed a connection, association, or relationship via social-networking system 1060.

In particular embodiments, social-networking system 1060 may provide users with the ability to take actions on various types of items or objects, supported by social-networking system 1060. As an example and not by way of limitation, the items and objects may include groups or social networks to which users of social-networking system 1060 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 1060 or by an external system of third-party system 1070, which is separate from social-networking system 1060 and coupled to social-networking system 1060 via a network 1010.

In particular embodiments, social-networking system 1060 may be capable of linking a variety of entities. As an example and not by way of limitation, social-networking system 1060 may enable users to interact with each other as well as receive content from third-party systems 1070 or other entities, or to allow users to interact with these entities through an application programming interfaces (API) or other communication channels.

In particular embodiments, a third-party system 1070 may include one or more types of servers, one or more data stores, one or more interfaces, including but not limited to APIs, one or more web services, one or more content sources, one or more networks, or any other suitable components, e.g., that servers may communicate with. A third-party system 1070 may be operated by a different entity from an entity operating social-networking system 1060. In particular embodiments, however, social-networking system 1060 and third-party systems 1070 may operate in conjunction with each other to provide social-networking services to users of social-networking system 1060 or third-party systems 1070. In this sense, social-networking system 1060 may provide a platform, or backbone, which other systems, such as third-party systems 1070, may use to provide social-networking services and functionality to users across the Internet.

In particular embodiments, a third-party system 1070 may include a third-party content object provider. A third-party content object provider may include one or more sources of content objects, which may be communicated to a client system 1030. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 1060 also includes user-generated content objects, which may enhance a user's interactions with social-networking system 1060. User-generated content may include anything a user can add, upload, send, or "post" to social-networking system 1060. As an example and not by way of limitation, a user communicates posts to social-networking system 1060 from a client system 1030. Posts may include data such as status updates or other textual data, location information, photos, videos, links, music or other similar data or media. Content may also be added to social-networking system 1060 by a third-party through a "communication channel," such as a newsfeed or stream.

In particular embodiments, social-networking system 1060 may include a variety of servers, sub-systems, programs, modules, logs, and data stores. In particular embodiments, social-networking system 1060 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 1060 may also include suitable components such as network interfaces, security mechanisms, load balancers, failover servers, management-and-network-operations consoles, other suitable components, or any suitable combination thereof. In particular embodiments, social-networking system 1060 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 1060 to one or more client systems 1030 or one or more third-party system 1070 via network 1010. The web server may include a mail server or other messaging functionality for receiving and routing messages between social-networking system 1060 and one or more client systems 1030. An API-request server may allow a third-party system 1070 to access information from social-networking system 1060 by calling one or more APIs. An action logger may be used to receive communications from a web server about a user's actions on or off social-networking system 1060. In conjunction with the action log, a third-party-content-object log may be maintained of user exposures to third-party-content objects. A notification controller may provide information regarding content objects to a client system 1030. Information may be pushed to a client system 1030 as notifications, or information may be pulled from client system 1030 responsive to a request received from client system 1030. Authorization servers may be used to enforce one or more privacy settings of the users of social-networking system 1060. A privacy setting of a user determines how particular information associated with a user can be shared. The authorization server may allow users to opt in to or opt out of having their actions logged by social-networking system 1060 or shared with other systems (e.g., third-party system 1070), such as, for example, by setting appropriate privacy settings. Third-party-content-object stores may be used to store content objects received from third parties, such as a third-party system 1070. Location stores may be used for storing location information received from client systems 1030 associated with users. Advertisement-pricing modules may combine social information, the current time, location information, or other suitable information to provide relevant advertisements, in the form of notifications, to a user.

Figure 11:
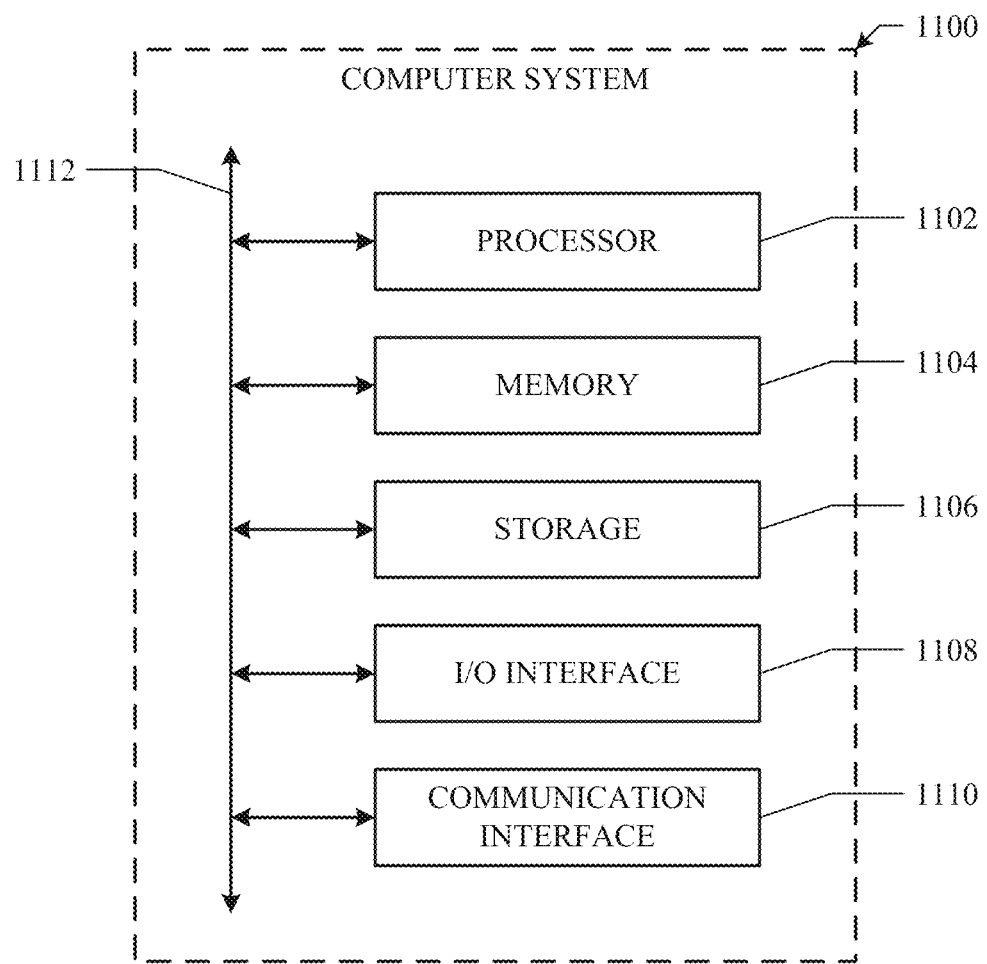
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing device:
   displaying a first image of a real environment to a user captured using a camera worn by the user;
   tracking motions performed by a hand of the user in response to the displayed first image;
   determining, based on the tracked motions, one or more anchor locations in a three-dimensional virtual reality space;
   generating, based on the one or more anchor locations, a virtual surface fixed in the three-dimensional virtual reality space;
   capturing a second image of the real environment using the camera worn by the user;
   determining a pose of the camera when the second image is captured;
   determining a region in the second image that, as viewed from the pose of the camera, corresponds to the virtual surface;
   determining a first viewpoint of a first eye of the user;
   rendering a first output image based on (1) the first viewpoint relative to the virtual surface and (2) the image region of the second image corresponding to the virtual surface; and
   displaying the first output image on a first display of the computing device, the first display being configured to be viewed by the first eye of the user.

2. The method of claim 1, wherein the one or more anchor locations correspond to a location of one or more objects in the real environment.

3. The method of claim 1, wherein the tracking motions comprise designating a first coordinate in the three-dimensional virtual reality space, wherein the one or more anchor locations are based on the first coordinate.

4. The method of claim 1, wherein the camera worn by the user is associated with a head-mounted device worn by the user that blocks the user from seeing the real environment directly.

5. The method of claim 1, further comprising determining a horizontal distance of the user from the virtual surface; wherein displaying the first output image is based on the horizontal distance of the user from the virtual surface exceeding a minimum threshold distance.

6. The method of claim 1, further comprising determining a vertical distance of the user from the virtual surface; wherein displaying the first output image is based on the vertical distance of the user from the virtual surface exceeding a minimum threshold distance.

7. The method of claim 1, wherein the computing device is an artificial reality device, further comprising determining an orientation of the artificial reality device relative to the virtual surface; wherein displaying the first output image is based on the orientation of the artificial reality device.

8. The method of claim 1, further comprising:
   determining a second viewpoint of a second eye of the user;
   rendering a second output image based on (1) the second viewpoint relative to the virtual surface and (2) the image region corresponding to the virtual surface; and
   displaying the second output image on a second display of the device, the second display being configured to be viewed by the second eye of the user.

9. One or more computer-readable non-transitory storage media embodying software that is operable when executed to:
   display a first image of a real environment to a user captured using a camera worn by the user;
   track motions performed by a hand of the user in response to the displayed first image;
   determine, based on the tracked motions, one or more anchor locations in a three-dimensional virtual reality space;
   generate, based on the one or more anchor locations, a virtual surface fixed in the three-dimensional virtual reality space;
   capture a second image of the real environment using the camera worn by the user;
   determine a pose of the camera when the second image is captured;
   determine a region in the second image that, as viewed from the pose of the camera, corresponds to the virtual surface;
   determine a first viewpoint of a first eye of the user;
   render a first output image based on (1) the first viewpoint relative to the virtual surface and (2) the image region of the second image corresponding to the virtual surface; and
   display the first output image on a first display of the device, the first display being configured to be viewed by the first eye of the user.

10. The media of claim 9, wherein the one or more anchor locations correspond to a location of one or more objects in the real environment.

11. The media of claim 9, wherein the tracking motions comprise designating a first coordinate in the three-dimensional virtual reality space, wherein the one or more anchor locations are based on the first coordinate.

12. The media of claim 9, wherein the computing device is a head-mounted device that blocks the user from seeing the real environment directly.

13. The media of claim 9, wherein the software is further operable when executed to determine a horizontal distance of the user from the virtual surface; wherein displaying the first output image is based on the horizontal distance of the user from the virtual surface.

14. The media of claim 9, wherein the software is further operable when executed to determine a vertical distance of the user from the virtual surface; wherein displaying the first output image is based on the vertical distance of the user from the virtual surface.

15. The media of claim 9, wherein the device is an artificial reality device, wherein the software is further operable when executed to determine an orientation of the artificial reality device relative to the virtual surface; wherein displaying the first output image is based on the orientation of the artificial reality device.

16. A system comprising:
one or more processors; and
one or more computer-readable non-transitory storage media coupled to one or more of the processors and comprising instructions operable when executed by one or more of the processors to cause the system to:
display a first image of a real environment to a user captured using a camera worn by the user;
track motions performed by a hand of the user in response to the displayed first image;
determine, based on the tracked motions, one or more anchor locations in a three-dimensional virtual reality space;
generate, based on the one or more anchor locations, a virtual surface fixed in the three-dimensional virtual reality space;
capture a second image of the real environment using the camera worn by the user;
determine a pose of the camera when the second image is captured;
determine a region in the second image that, as viewed from the pose of the camera, corresponds to the virtual surface;
determine a first viewpoint of a first eye of the user;
render a first output image based on (1) the first viewpoint relative to the virtual surface and (2) the image region of the second image corresponding to the virtual surface; and
display the first output image on a first display of the device, the first display being configured to be viewed by the first eye of the user.

17. The system of claim 16, wherein the one or more anchor locations correspond to a location of one or more objects in the real environment.

18. The system of claim 16, wherein the tracking motions comprise designating a first coordinate in the three-dimensional virtual reality space, wherein the one or more anchor locations are based on the first coordinate.

19. The system of claim 16, wherein the computing device is a head-mounted device that blocks the user from seeing the real environment directly.

20. The system of claim 16, wherein the instructions further cause the system to determine a horizontal distance of the user from the virtual surface; wherein the first output image is displayed based on the horizontal distance of the user from the virtual surface exceeding a minimum threshold distance.

* * * * *